United States Patent
Mellet et al.

(10) Patent No.: US 9,039,564 B2
(45) Date of Patent: May 26, 2015

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 68 days.

(21) Appl. No.: 13/918,100

(22) Filed: Jun. 14, 2013

(65) Prior Publication Data

US 2013/0345014 A1    Dec. 26, 2013

Related U.S. Application Data

(60) Provisional application No. 61/663,142, filed on Jun. 22, 2012.

(51) Int. Cl.
| | |
|---|---|
| *F16H 37/06* | (2006.01) |
| *F16H 3/44* | (2006.01) |
| *F16H 3/62* | (2006.01) |
| *F16H 3/66* | (2006.01) |

(52) U.S. Cl.
CPC .. *F16H 3/62* (2013.01); *F16H 3/66* (2013.01); *F16H 2200/0069* (2013.01); *F16H 2200/2012* (2013.01); *F16H 2200/2046* (2013.01)

(58) Field of Classification Search
CPC ............... F16H 2200/0069; F16H 2200/2046; F16H 2200/2012

USPC .......... 475/269, 275–277, 282, 288, 296, 330
See application file for complete search history.

(56) References Cited

U.S. PATENT DOCUMENTS

| | | |
|---|---|---|
| 6,960,149 B2 | 11/2005 | Ziemer |
| 6,984,187 B2 | 1/2006 | Biermann |
| 6,991,578 B2 | 1/2006 | Ziemer |
| 7,549,942 B2 | 6/2009 | Gumpoltsberger |
| 7,556,582 B2 | 7/2009 | Gumpoltsberger |
| 7,566,283 B2 | 7/2009 | Gumpoltsberger |
| 7,575,533 B2 | 8/2009 | Gumpoltsberger |
| 7,632,206 B2 | 12/2009 | Gumpoltsberger |
| 7,670,246 B2 | 3/2010 | Kamm et al. |
| 7,699,743 B2 | 4/2010 | Diosi et al. |
| 7,789,792 B2 | 9/2010 | Kamm et al. |
| 7,803,082 B2 | 9/2010 | Diosi et al. |
| 7,824,302 B2 | 11/2010 | Diosi et al. |
| 7,957,869 B2 | 6/2011 | Popp et al. |
| 8,007,394 B2 * | 8/2011 | Phillips et al. ................. 475/275 |

(Continued)

FOREIGN PATENT DOCUMENTS

| | | |
|---|---|---|
| CN | 101852278 A | 10/2010 |
| DE | 2439604 A1 | 3/1975 |

(Continued)

*Primary Examiner* — Roger Pang
*Assistant Examiner* — Tinh Dang

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include clutches and brakes actuatable in combinations of three to establish a plurality of forward gear ratios and at least one reverse gear ratio.

24 Claims, 4 Drawing Sheets

(56) References Cited

U.S. PATENT DOCUMENTS

| | | | |
|---|---|---|---|
| 8,016,712 B2 | 9/2011 | Phillips et al. | |
| 8,100,808 B2 * | 1/2012 | Wittkopp et al. | 475/276 |
| 8,465,390 B2 * | 6/2013 | Brehmer et al. | 475/282 |
| 8,574,114 B2 * | 11/2013 | Brehmer et al. | 475/282 |
| 2008/0234093 A1 | 9/2008 | Diosi et al. | |
| 2009/0124448 A1 * | 5/2009 | Wittkopp et al. | 475/275 |
| 2009/0176612 A1 | 7/2009 | Popp et al. | |
| 2010/0210403 A1 | 8/2010 | Wittkopp et al. | |
| 2013/0210570 A1 * | 8/2013 | Mellet et al. | 475/275 |
| 2014/0128209 A1 * | 5/2014 | Phillips et al. | 475/311 |
| 2014/0274546 A1 * | 9/2014 | Mellet et al. | 475/275 |

FOREIGN PATENT DOCUMENTS

| | | |
|---|---|---|
| DE | 102004040611 A1 | 3/2006 |
| DE | 102004040614 A1 | 3/2006 |
| DE | 102004040615 A1 | 3/2006 |
| DE | 102004040904 A1 | 3/2006 |
| DE | 102005005617 A1 | 3/2006 |
| DE | 102005005616 A1 | 8/2006 |
| DE | 102005032878 A1 | 1/2007 |
| DE | 102005032879 A1 | 1/2007 |
| DE | 102005032881 A1 | 1/2007 |
| DE | 102005032884 A1 | 1/2007 |
| DE | 102005032885 A1 | 1/2007 |
| DE | 102005032931 A1 | 1/2007 |
| DE | 102005032880 A1 | 2/2007 |
| DE | 102006001746 A1 | 8/2007 |
| DE | 102008041193 A1 | 2/2010 |
| DE | 102008041194 A1 | 2/2010 |
| DE | 102008041196 A1 | 2/2010 |
| DE | 102008041198 A1 | 2/2010 |
| DE | 102008041201 A1 | 2/2010 |
| DE | 102008041202 A1 | 2/2010 |
| DE | 102008041203 A1 | 2/2010 |
| DE | 102008041205 A1 | 2/2010 |
| DE | 102008041208 A1 | 2/2010 |
| DE | 102008041212 A1 | 2/2010 |
| DE | 102008041215 A1 | 2/2010 |
| DE | 102008063699 A1 | 6/2010 |
| DE | 102009019045 A1 | 11/2010 |
| DE | 102009019046 A1 | 11/2010 |
| DE | 102009020445 A1 | 11/2010 |
| DE | 102009025608 A1 | 12/2010 |
| DE | 102009025609 A1 | 12/2010 |
| DE | 102009025610 A1 | 12/2010 |
| DE | 102009031543 A1 | 1/2011 |
| DE | 102009031544 A1 | 1/2011 |

* cited by examiner

| GEAR STATE | GEAR RATIO | RATIO STEP | TORQUE TRANSMITTING ELEMENTS | | | | | |
|---|---|---|---|---|---|---|---|---|
| | | | 32 | 34 | 24 | 26 | 30 | 28; 28', 28" |
| REV | -5.702 | | X | X | | | X | |
| N | | -1.21 | | | | | | |
| 1ST | 4.700 | | X | X | X | | | |
| 2ND | 2.959 | 1.59 | X | X | | X | | |
| 3RD | 2.094 | 1.41 | X | | X | X | | |
| 4TH | 1.731 | 1.21 | X | | | X | | X |
| 4TH | 1.731 | 1.00 | X | | | | X | X |
| 4TH | 1.731 | 1.00 | X | | | X | X | |
| 5TH | 1.498 | 1.16 | X | | X | | | X |
| 6TH | 1.243 | 1.21 | X | | X | | X | |
| 7TH | 1.000 | 1.24 | | | X | X | | X |
| 7TH | 1.000 | 1.00 | | | X | | X | X |
| 7TH | 1.000 | 1.00 | | | X | X | X | |
| 8TH | 0.863 | 1.16 | | X | X | | X | |
| 9TH | 0.683 | 1.26 | | X | X | | | X |
| 10TH | 0.630 | 1.09 | | X | | X | | X |
| 10TH | 0.630 | 1.00 | | X | | | X | X |
| 10TH | 0.630 | 1.00 | | X | | X | X | |

X = ON - ENGAGED CARRYING TORQUE

FIG. 7

MULTI-SPEED TRANSMISSION

CROSS-REFERENCE TO RELATED APPLICATIONS

This application claims the benefit of U.S. Provisional Application No. 61/663,142, filed on Jun. 22, 2012, which is hereby incorporated in its entirety herein by reference.

FIELD

The invention relates generally to a multiple speed transmission, and more particularly, to a transmission having a plurality of speeds, planetary gear sets and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

In another embodiment of the present invention, the clutches and brakes can be of any type including but not limited to a fiction clutch, a friction band, a one way clutch, a selectable one way clutch, a dog clutch, a synchronizer and similar devices. Furthermore, any node can use a single device or a combination of these devices e.g. the first brake may be configured as a dog clutch and a one way clutch combination or a one way clutch and friction clutch combination. Accordingly, other combinations are possible.

In yet another embodiment of the present invention, the transmission includes three interconnecting members continuously interconnecting at least one member of the first, second, third and fourth planetary gear sets with at least another member of the first, second, third and fourth planetary gear sets.

In yet another embodiment of the present invention, the transmission includes six torque transmitting mechanisms wherein four of the six torque transmitting mechanisms are each selectively engageable to interconnect at least one of the first, second and third members with at least one other of the first, second, third members and wherein two of the six torque transmitting mechanisms are each selectively engageable to interconnect at least one of the first, second and third members with a stationary member.

In yet another embodiment of the present invention, the six torque transmitting mechanisms are selectively engageable to establish a plurality of forward speed ratios and at least one reverse speed ratio between the input member and the output member.

In yet another embodiment of the present invention, the transmission includes first, second, third and fourth planetary gear sets each having a sun gear, a carrier member and a ring gear, wherein the input member is continuously connected for common rotation with the carrier member of the second planetary gear set, and wherein the output member is continuously connected for common rotation with the carrier member of the fourth planetary gear set.

In yet another embodiment of the present invention, the transmission includes a first interconnecting member continuously interconnecting the sun gear of the first planetary gear set with the sun gear of the second planetary gear set.

In yet another embodiment of the present invention, the transmission includes a second interconnecting member continuously interconnecting the carrier member of the first planetary gear set with the carrier member of the third planetary gear set and the ring gear of the fourth planetary gear set.

In yet another embodiment of the present invention, the transmission includes a third interconnecting member continuously interconnecting the ring gear of the second planetary gear set with the sun gear of the third planetary gear set.

In yet another embodiment of the present invention, the transmission includes a first torque transmitting mechanism selectively engageable to interconnect the carrier member of the second planetary gear set and the input member with the sun gear of the fourth planetary gear set.

In yet another embodiment of the present invention, the transmission includes a second torque transmitting mechanism selectively engageable to interconnect the ring gear of the second planetary gear set and the sun gear of the third planetary gear set with the sun gear of the fourth planetary gear set.

In still another embodiment of the present invention, the transmission includes a third torque transmitting mechanism selectively engageable to interconnect the ring gear of the third planetary gear set with the carrier member of the third planetary gear set, the carrier member of the first planetary gear set and the ring gear of the fourth planetary gear set.

In still another embodiment of the present invention, the transmission includes a fourth torque transmitting mechanism selectively engageable to interconnect the ring gear of the third planetary gear set with the sun gear of the fourth planetary gear set.

In still another embodiment of the present invention, the transmission includes a fifth torque transmitting mechanism selectively engageable to interconnect the ring gear of the first planetary gear set with the stationary member.

In still another embodiment of the present invention, the transmission includes a sixth torque transmitting mechanism selectively engageable to interconnect the sun gear of the first planetary gear set and the sun gear of the second planetary gear set with the stationary member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 7 is a truth table presenting an example of a state of engagement of various torque transmitting elements to produce multiple forward and at least one reverse speed or gear ratios of the transmissions illustrated in FIGS. 1-6.

DETAILED DESCRIPTION

The following description is merely exemplary in nature and is not intended to limit the present disclosure, application, or uses.

At the outset, it should be appreciated that the embodiments of the multi-speed automatic transmission of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a first component or element of a first planetary gear set is permanently coupled to a first component or element of a second planetary gear set. A second component or element of the first planetary gear set is permanently coupled to a second component or element of a third planetary gear set and to a first component or element of a fourth planetary gear set. A third component or element of the second planetary gear set is permanently coupled to a third component or element of a third planetary gear set.

Figure 1:
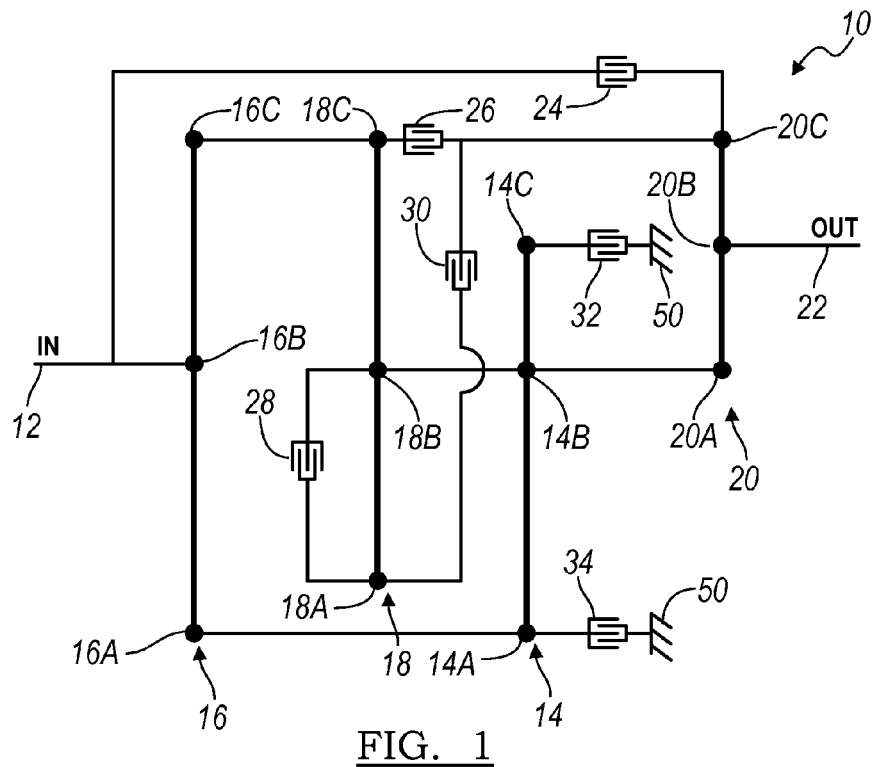
FIG. 1 is a lever diagram of an embodiment of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 16B of the second planetary gear set 16. The output member 22 is continuously coupled to the second node 20B of the fourth planetary gear set 20.

The first node 14A of the first planetary gear set 14 is coupled to the first node 16A of the second planetary gear set 16. The second node 14B of the first planetary gear set 14 is coupled to the second node 18B of the third planetary gear set 18 and to the first node 20A of the fourth planetary gear set 20. The third node 16C of the second planetary gear set 16 is coupled to the third node 18C of the third planetary gear set 18.

A first clutch 24 selectively connects the second node 16B of the second planetary gear set 16 with the third node 20C of the fourth planetary gear set 20. A second clutch 26 selectively connects the third node 16C of the second planetary gear set 16 and the third node 18C of the third planetary gear set 18 with the third node 20C of the fourth planetary gear set 20. A third clutch 28 selectively connects the second node 14B of the first planetary gear set 14, the second node 18B of the third planetary gear set 18 and the first node 20A of the fourth planetary gear set 20 with the first node 18A of the third planetary gear set 18. A fourth clutch 30 selectively connects the first node 18A of the third planetary gear set 18 with the third node 20C of the fourth planetary gear set 20.

A first brake 32 selectively connects the third node 14C of the first planetary gear set 14 with the stationary member or transmission housing 50. A second brake 34 selectively connects the first node 14A of the first planetary gear set 14 and the first node 16A of the second planetary gear set 16 with the stationary member or transmission housing 50.

Figure 2:
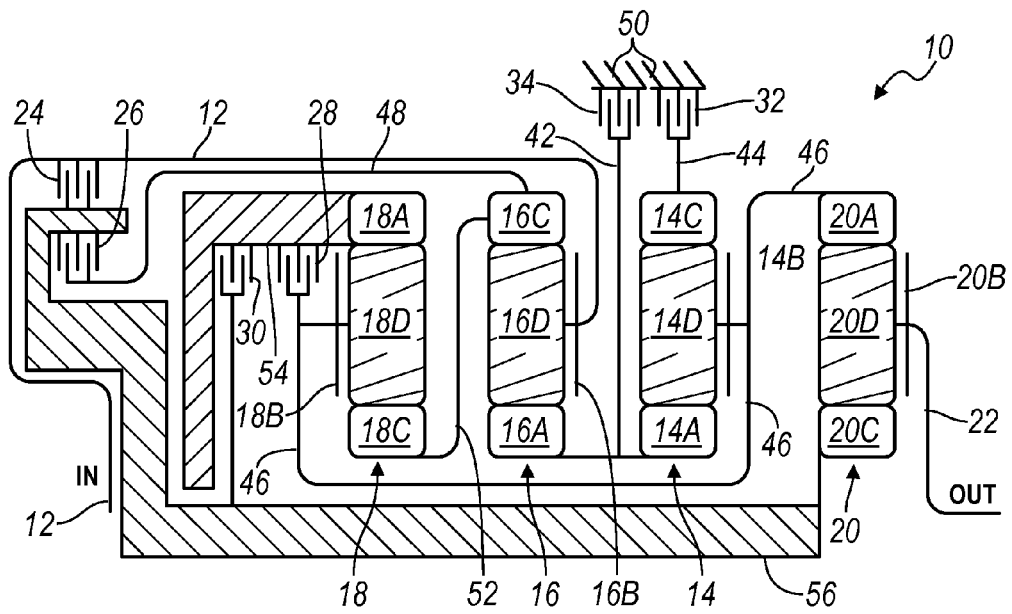
FIG. 2 is a diagrammatic illustration of a variation of the transmission of FIG. 1 according to the principles of the present invention.
Figure 3:
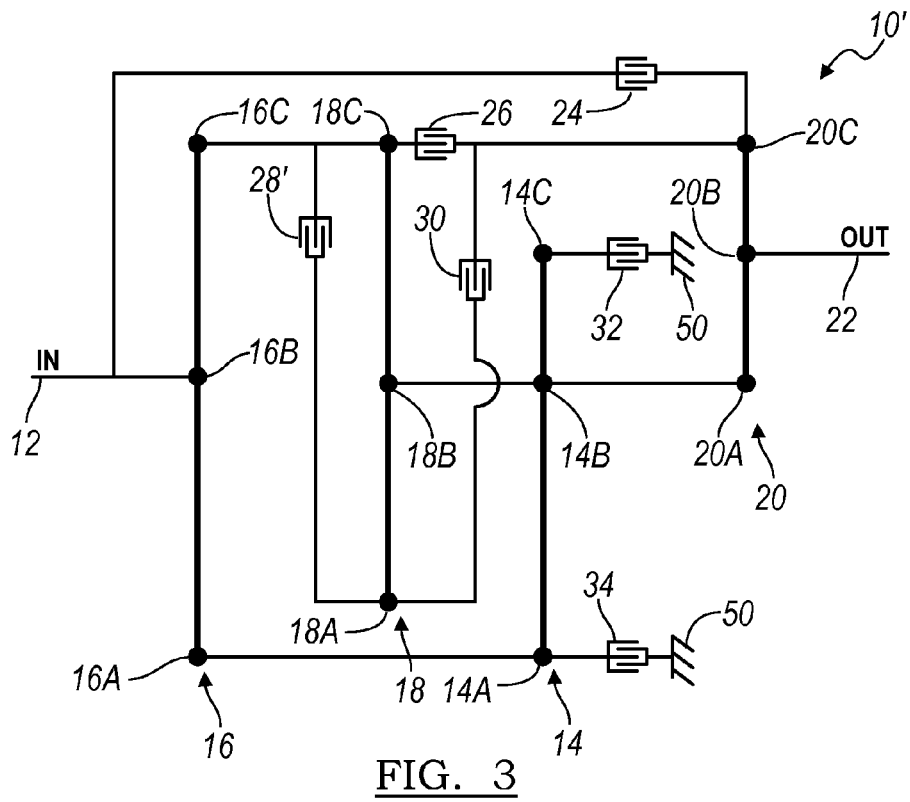
FIG. 3 is a lever diagram of an embodiment of a transmission according to the principles of present invention.

Referring now to FIG. 2, a stick diagram presents a schematic layout of an embodiment of the multi-speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14C, and a planet gear carrier member 14B that rotatably supports a set of planet gears 14D (only one of which is shown) The sun gear member 14A is connected for common rotation with a first shaft or interconnecting member 42. The ring gear member 14C is connected for common rotation with a second shaft or interconnecting member 44. The planet carrier member 14B is connected for common rotation with a third shaft or interconnecting member 46. The set of planet gears 14D are each configured to intermesh with both the sun gear member 14A and the ring gear member 14C.

The second planetary gear set 16 includes a sun gear member 16A, a ring gear member 16C, and a planet gear carrier member 16B that rotatably supports a set of planetary gears 16D (only one of each is shown). The sun gear member 16A is connected for common rotation with the first shaft or interconnecting member 42. The ring gear member 16C is connected for common rotation with a fourth shaft or interconnecting member 48 and a fifth shaft or interconnecting member 52. The planet carrier member 16B is connected for common rotation with the input shaft or member 12. The planet gears 16D are each configured to intermesh with both the ring gear member 16C and the sun gear member 16A.

The third planetary gear set 18 includes a sun gear member 18C, a ring gear member 18A, and a planet gear carrier member 18B that rotatably supports a set of planet gears 18D (only one of which is shown). The sun gear member 18C is connected for common rotation with the fifth shaft or interconnecting member 52. The ring gear member 18A is connected for common rotation with a sixth shaft or interconnecting member 54. The planet carrier member 18B is connected for common rotation with the third shaft or interconnecting member 46. The planet gears 18D are each configured to intermesh with both the sun gear member 18C and the ring gear member 18A.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with the seventh shaft or interconnecting member 56. The ring gear member 20A is connected for common rotation with the third shaft or interconnecting member 46. The planetary gear carrier member 20B is connected for common rotation with the output shaft or member 22. The planet gears 20D are each configured to intermesh with both the sun gear member 20C and the ring gear member 20A.

The input shaft or member 12 is continuously connected or connectable to an input source, such as an engine (not shown) or a turbine of a torque converter (not shown). The output shaft or member 22 is continuously connected with another output such as the final drive unit or transfer case (not shown).

The torque-transmitting mechanisms, including the first, second, third and fourth clutches 24, 26, 28, 30 and the first and second brakes 32 and 34 allow for selective interconnection of the shafts or interconnecting members 42, 44, 46, 48, 52, 54, and 56 to the planetary gear sets 14, 16, 18, 20 and the housing 50.

For example, the first clutch 24 is selectively engageable to connect the input shaft or member 12 with the seventh shaft or interconnecting member 56. The second clutch 26 is selectively engageable to connect the fourth shaft or interconnecting member 48 with the seventh shaft or interconnecting member 56. The third clutch 28 is selectively engageable to connect the third shaft or interconnecting member 46 with the sixth shaft or interconnecting member 54. The fourth clutch 30 is selectively engageable to connect the sixth shaft or interconnecting member 54 with the seventh shaft or interconnecting member 56.

The first brake 32 is selectively engageable to connect the second shaft or interconnecting member 44 with the stationary element or the transmission housing 50 in order to restrict the member 44 from rotating relative to the transmission housing 50. The second brake 34 is selectively engageable to connect the first shaft or interconnecting member 42 with the stationary element or the transmission housing 50 in order to restrict the member 42 from rotating relative to the transmission housing 50. In turn, the components of the planetary gear sets connected to each of the connecting members are also connected or restricted accordingly.

Figure 4:
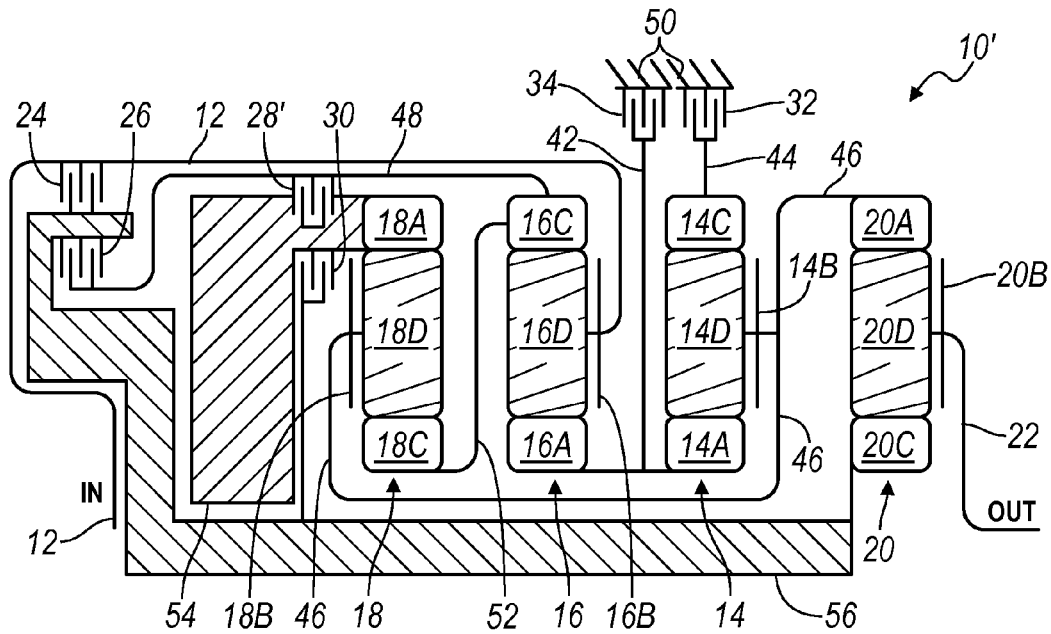
FIG. 4 is a diagrammatic illustration of a variation of the transmission of FIG. 1 according to the principles of the present invention.
Figure 5:
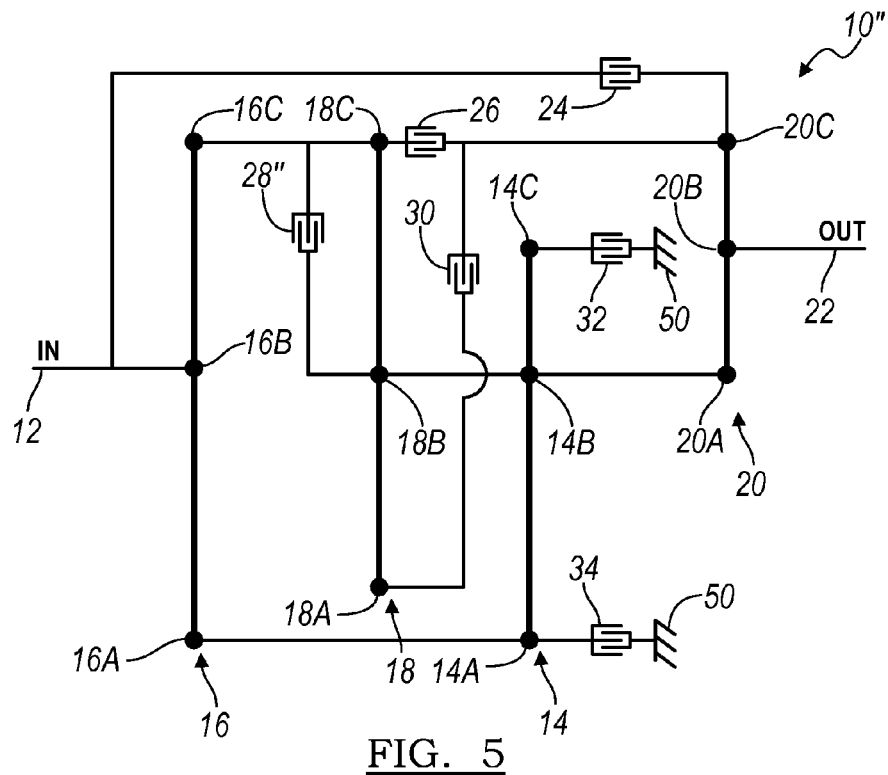
FIG. 5 is a lever diagram of an embodiment of a transmission according to the principles of present invention.
Figure 6:
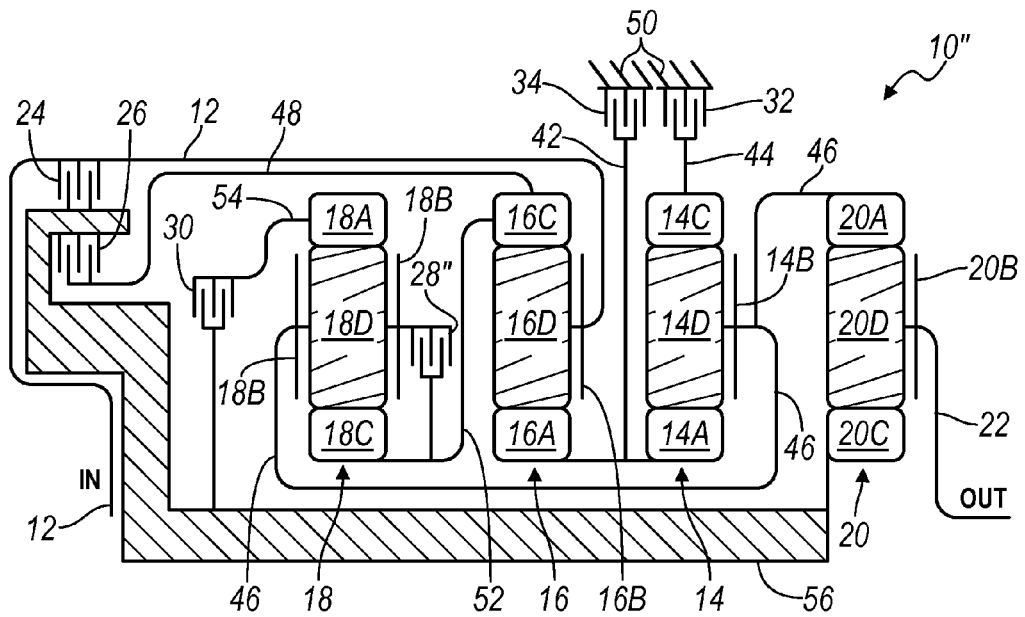
FIG. 6 is a diagrammatic illustration of a variation of the transmission of FIG. 1 according to the principles of the present invention.

Additionally, the present invention contemplates other embodiments of transmission 10 having different interconnections for the third clutch 28 as illustrated in FIGS. 3, 4, 5 and 6. For example, in FIG. 3 a transmission 10' has the third clutch 28' selectively interconnecting the third node 16C of the second planetary gear set 16 and the third node 18C of the third planetary gear set 18 with the first node 18A of the third planetary gear set 18. In FIG. 4, transmission 10' has the third clutch 28' selectively interconnecting the ring gear 16C of the second planetary gear set 16 and the sun gear 18C of the third planetary gear set 18 with the ring gear 18A of the third planetary gear set 18. In FIG. 5, a transmission 10" has the third clutch 28" selectively interconnecting the third node 16C of the second planetary gear set 16 and the third node 18C of the third planetary gear set 18 with the second node 18B of the third planetary gear set 18, the second node 14B of the first planetary gear set 14 and the first node 20A of the fourth planetary gear set 20. In FIG. 6, the transmission 10'" has the third clutch 28" selectively interconnecting the ring gear 16C of the second planetary gear set 16 and the sun gear 18C of the third planetary gear set 18 with the carrier member 18B of the third planetary gear set 18, the carrier member 14B of the first planetary gear set 14 and the ring gear 20A of the fourth planetary gear set 20.

Referring now to FIGS. 1, 2 and FIG. 7, the operation of the multi-speed transmission 10 embodiment will be described. It will be appreciated that transmission 10 is capable of transmitting torque from the input shaft or member 12 to the output shaft or member 22 in multiple forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, first brake 32 and second brake 34), as will be explained below.

FIG. 7 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the fourth clutch 30, the first brake 32 and the second brake 34 are engaged or activated. The fourth clutch 30 connects the sixth shaft or interconnecting member 54 with the seventh shaft or interconnecting member 56. The first brake 32 connects the second shaft or interconnecting member 44 with the stationary element or the transmission housing 50 in order to restrict the member 44 from rotating relative to the transmission housing 50, which restricts the ring gear 14C from rotating relative to the transmission housing 50. The second brake 34 connects the first shaft or interconnecting member 42 with the stationary element or the transmission housing 50 in order to restrict the member 42 from rotating relative to the transmission housing 50, which restricts the sun gears 14A and 16A from rotating relative to the transmission housing 50. Likewise, multiple forward ratios are achieved through different combinations of clutch and brake engagement, as shown in FIG. 7, by way of example. Moreover, the present invention contemplates additional or alternative combinations of clutch and brake engagement to achieve the fourth, seventh and tenth gear ratios as shown in FIG. 7.

It will be appreciated that the foregoing explanation of operation and gear states of the multi-speed embodiment of transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. Further, the operation and establishment of various gear ratios of transmissions 10' and 10" are for example provided by the engagement of the torque transmitting elements (i.e. first clutch 24, second clutch 26, third clutch 28' or 28", fourth clutch 30, first brake 32 and second brake 34), as shown in FIG. 7.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members, and wherein the input member is continuously connected for common rotation with the second member of the second planetary gear set and the output member is continuously connected for common rotation with the second member of the fourth planetary gear set;
three interconnecting members continuously interconnecting at least one member of the first, second, third and fourth planetary gear sets with at least another member of the first, second, third and fourth planetary gear sets; and
six torque transmitting mechanisms wherein one of the six torque transmitting mechanisms is selectively engageable to interconnect at least one of the first, second and third members with at least one other of the first, second, third members, three of the six torque transmitting mechanisms are each selectively engageable to interconnect at least one of the first, second and third members with the third member of the fourth planetary gear set, and two of the six torque transmitting mechanisms are each selectively engageable to interconnect at least one of the first, second and third members with a stationary member, and
wherein the six torque transmitting mechanisms are selectively engageable to establish a plurality of forward speed ratios and at least one reverse speed ratio between the input member and the output member.

2. The transmission of claim 1 wherein the three interconnecting members further comprises a first interconnecting member continuously interconnecting the first member of the first planetary gear set with the first member of the second planetary gear set, a second interconnecting member continuously interconnecting the second member of the first planetary gear set with the second member of the third planetary gear set and the first member of the fourth planetary gear set and a third interconnecting member continuously interconnecting the third member of the second planetary gear set with the third member of the third planetary gear set.

3. The transmission of claim 2 wherein a first of the six torque transmitting mechanisms is selectively engageable to interconnect the second member of the second planetary gear set and the input member with the third member of the fourth planetary gear set.

4. The transmission of claim 3 wherein a second of the six torque transmitting mechanisms is selectively engageable to interconnect the third member of the second planetary gear set and the third member of the third planetary gear set with the third member of the fourth planetary gear set.

5. The transmission of claim 4 wherein a third of the six torque transmitting mechanisms is selectively engageable to interconnect the first member of the third planetary gear set with the second member of the third planetary gear set, the second member of the first planetary gear set and the first member of the fourth planetary gear set.

6. The transmission of claim 4 wherein a third of the six torque transmitting mechanisms is selectively engageable to interconnect the first member of the third planetary gear set with the third member of the second planetary gear set and the third member of the third planetary gear set.

7. The transmission of claim 4 wherein a third of the six torque transmitting mechanisms is selectively engageable to interconnect the third member of the second planetary gear set and the third member of the third planetary gear set with the second member of the third planetary gear set, the second member of the first planetary gear set and the first member of the fourth planetary gear set.

8. The transmission of claim 5 wherein a fourth of the six torque transmitting mechanisms is selectively engageable to interconnect the first member of the third planetary gear set with the third member of the fourth planetary gear set.

9. The transmission of claim 6 wherein a fifth of the six torque transmitting mechanisms is selectively engageable to interconnect the third member of the first planetary gear set with the stationary member.

10. The transmission of claim 9 wherein a sixth of the six torque transmitting mechanisms is selectively engageable to interconnect the first member of the first planetary gear set and the first member of the second planetary gear set with the stationary member.

11. The transmission of claim 1 wherein the first member of the first planetary gear set, the first member of the second planetary gear set, the third member of the third planetary gear set and the third member of the fourth planetary gear set are sun gears, the second members of the first, second, third and fourth planetary gear sets are carrier members and the third member of the first planetary gear set, the third member of the second planetary gear set, the first member of the third planetary gear set and the first member of the fourth planetary gear set are ring gears.

12. A transmission comprising:
an input member;
an output member;
first, second, third and fourth planetary gear sets each having first, second and third members;
a first interconnecting member continuously interconnecting the first member of the first planetary gear set with the first member of the second planetary gear set;
a second interconnecting member continuously interconnecting the second member of the first planetary gear set with the second member of the third planetary gear set and the first member of the fourth planetary gear set;
a third interconnecting member continuously interconnecting the third member of the second planetary gear set with the third member of the third planetary gear set; and six torque transmitting mechanisms each selectively engageable to interconnect at least one of the first, second, and third members with at least one other of the first, second, third members and a stationary member, and wherein the six torque transmitting mechanisms are selectively engageable to establish a plurality of forward speed ratios and at least one reverse speed ratio between the input member and the output member.

13. The transmission of claim 12 wherein a first of the six torque transmitting mechanisms is selectively engageable to interconnect the second member of the second planetary gear set and the input member with the third member of the fourth planetary gear set.

14. The transmission of claim 13 wherein a second of the six torque transmitting mechanisms is selectively engageable to interconnect the third member of the second planetary gear set and the third member of the third planetary gear set with the third member of the fourth planetary gear set.

15. The transmission of claim 14 wherein a third of the six torque transmitting mechanisms is selectively engageable to interconnect the first member of the third planetary gear set with the second member of the third planetary gear set, the second member of the first planetary gear set and the first member of the fourth planetary gear set.

16. The transmission of claim 14 wherein a third of the six torque transmitting mechanisms is selectively engageable to interconnect the first member of the third planetary gear set with the third member of the second planetary gear set and the third member of the third planetary gear set.

17. The transmission of claim 14 wherein a third of the six torque transmitting mechanisms is selectively engageable to interconnect the third member of the second planetary gear set and the third member of the third planetary gear set with the second member of the third planetary gear set, the second member of the first planetary gear set and the first member of the fourth planetary gear set.

18. The transmission of claim 15 a fourth of the six torque transmitting mechanisms is selectively engageable to interconnect the first member of the third planetary gear set with the third member of the fourth planetary gear set.

19. The transmission of claim 18 wherein a fifth of the six torque transmitting mechanisms is selectively engageable to interconnect the third member of the first planetary gear set with the stationary member.

20. The transmission of claim 19 wherein a sixth of the six torque transmitting mechanisms is selectively engageable to interconnect the first member of the first planetary gear set and the first member of the second planetary gear set with the stationary member.

21. The transmission of claim 12 wherein the input member is continuously connected for common rotation with the second member of the second planetary gear set.

22. The transmission of claim 12 wherein the output member is continuously connected for common rotation with the second member of the fourth planetary gear set.

23. The transmission of claim 12 wherein the first member of the first planetary gear set, the first member of the second planetary gear set, the third member of the third planetary gear set and the third member of the fourth planetary gear set are sun gears, the second members of the first, second, third and fourth planetary gear sets are carrier members and the third member of the first planetary gear set, the third member of the second planetary gear set, the first member of the third planetary gear set and the first member of the fourth planetary gear set are ring gears.

24. A transmission comprising:
an input member;
an output member;
first, second, third and fourth planetary gear sets each having a sun gear, a carrier member and a ring gear, wherein the input member is continuously connected for common rotation with the carrier member of the second planetary gear set, and wherein the output member is continuously connected for common rotation with the carrier member of the fourth planetary gear set;
a first interconnecting member continuously interconnecting the sun gear of the first planetary gear set with the sun gear of the second planetary gear set;
a second interconnecting member continuously interconnecting the carrier member of the first planetary gear set with the carrier member of the third planetary gear set and the ring gear of the fourth planetary gear set;
a third interconnecting member continuously interconnecting the ring gear of the second planetary gear set with the sun gear of the third planetary gear set;
a first torque transmitting mechanism selectively engageable to interconnect the carrier member of the second planetary gear set and the input member with the sun gear of the fourth planetary gear set;
a second torque transmitting mechanism selectively engageable to interconnect the ring gear of the second planetary gear set and the sun gear of the third planetary gear set with the sun gear of the fourth planetary gear set;
a third torque transmitting mechanism selectively engageable to interconnect the ring gear of the third planetary gear set with the carrier member of the third planetary gear set, the carrier member of the first planetary gear set and the ring gear of the fourth planetary gear set;
a fourth torque transmitting mechanism selectively engageable to interconnect the ring gear of the third planetary gear set with the sun gear of the fourth planetary gear set;
a fifth torque transmitting mechanism selectively engageable to interconnect the ring gear of the first planetary gear set with the stationary member; and
a sixth torque transmitting mechanism selectively engageable to interconnect the sun gear of the first planetary gear set and the sun gear of the second planetary gear set with the stationary member, and wherein the torque transmitting mechanisms are selectively engageable to establish a plurality of forward speed ratios and at least one reverse speed ratio between the input member and the output member.

* * * * *